(12) United States Patent
Gukeisen

(10) Patent No.: US 10,179,653 B2
(45) Date of Patent: Jan. 15, 2019

(54) PYLON SHAPE WITH GEARED TURBOFAN FOR STRUCTURAL STIFFNESS

(71) Applicant: United Technologies Corporation, Hartford, CT (US)

(72) Inventor: Robert L. Gukeisen, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 232 days.

(21) Appl. No.: 14/432,581

(22) PCT Filed: Feb. 12, 2013

(86) PCT No.: PCT/US2013/025717
§ 371 (c)(1),
(2) Date: Mar. 31, 2015

(87) PCT Pub. No.: WO2014/055103
PCT Pub. Date: Apr. 10, 2014

(65) Prior Publication Data
US 2015/0239568 A1 Aug. 27, 2015

Related U.S. Application Data

(60) Provisional application No. 61/708,927, filed on Oct. 2, 2012.

(51) Int. Cl.
*B64D 27/12* (2006.01)
*F02K 3/06* (2006.01)
(Continued)

(52) U.S. Cl.
CPC ............. *B64D 27/12* (2013.01); *B64D 27/18* (2013.01); *B64D 27/26* (2013.01); *F02C 7/20* (2013.01);
(Continued)

(58) Field of Classification Search
CPC .................... B64D 27/26; B64D 27/18; F05D 2260/40311; Y02T 50/44
(Continued)

(56) References Cited

U.S. PATENT DOCUMENTS 4,410,150 A  10/1983 Lahti
4,428,189 A   1/1984 Greenberg et al.
(Continued)

FOREIGN PATENT DOCUMENTS

WO   2014/055102 A1   4/2014

OTHER PUBLICATIONS

European Search Report for EP Application No. 13843578.9 dated Oct. 1, 2015.
(Continued)

*Primary Examiner* — Timothy D Collins
*Assistant Examiner* — Keith L Dixon
(74) *Attorney, Agent, or Firm* — Carlson, Gaskey & Olds, P.C.

(57) ABSTRACT

A gas turbine includes a mounting structure for mounting the engine to a pylon. A propulsor section includes a fan having a fan diameter. A geared architecture drives the fan. A generator section includes a fan drive turbine that drives the geared architecture. A turbine to fan diameter ratio is substantially less than 45%.

17 Claims, 2 Drawing Sheets

(51) Int. Cl.
*F02C 7/20* (2006.01)
*B64D 27/18* (2006.01)
*B64D 27/26* (2006.01)

(52) U.S. Cl.
CPC .......... *F02K 3/06* (2013.01); *B64D 2027/266* (2013.01); *F05D 2260/40311* (2013.01); *Y02T 50/44* (2013.01)

(58) Field of Classification Search
USPC .......................................................... 244/54
See application file for complete search history.

(56) References Cited

U.S. PATENT DOCUMENTS

| | | | |
|---|---|---|---|
| 4,658,579 A | 4/1987 | Bower et al. | |
| 5,135,185 A | 8/1992 | Adamson et al. | |
| 5,174,525 A * | 12/1992 | Schilling | F02C 7/20 244/54 |
| 5,452,575 A | 9/1995 | Freid | |
| 5,860,276 A * | 1/1999 | Newton | B64D 27/18 60/226.1 |
| 7,841,165 B2 * | 11/2010 | Orlando | F01D 15/12 60/204 |
| 8,118,251 B2 | 2/2012 | Suciu et al. | |
| 8,128,021 B2 * | 3/2012 | Suciu | B64D 27/26 244/54 |
| 8,256,707 B2 | 9/2012 | Suciu et al. | |
| 9,211,955 B1 * | 12/2015 | Mauldin | B64D 27/26 |
| 2004/0128978 A1 | 7/2004 | McCune et al. | |
| 2006/0248900 A1 * | 11/2006 | Suciu | F02C 7/32 60/802 |
| 2008/0191088 A1 | 8/2008 | Diochon et al. | |
| 2009/0056343 A1 | 3/2009 | Suciu et al. | |
| 2009/0314881 A1 * | 12/2009 | Suciu | B64D 27/26 244/54 |
| 2010/0037586 A1 | 2/2010 | Gurin et al. | |
| 2011/0127368 A1 | 6/2011 | Penda et al. | |
| 2012/0099963 A1 | 4/2012 | Suciu et al. | |
| 2012/0117940 A1 | 5/2012 | Winter | |
| 2012/0124964 A1 | 5/2012 | Hasel et al. | |
| 2012/0233982 A1 | 9/2012 | Suciu et al. | |
| 2013/0192233 A1 * | 8/2013 | Eastwood | F23R 3/002 60/752 |

OTHER PUBLICATIONS

International Search Report and Written Opinion for International Application No. PCT/US2013/025717 dated Jun. 26, 2013.
International Preliminary Report on Patentabilty for PCT Application No. PCT/US2013/025717, dated Apr. 16, 2015.
Third Party Observations submitted by Rolls-Royce plc for EP Application No. 13843578.9 on Aug. 24, 2018.
Rauch, D. (1972). Design study of an air pump and integral lift engine ALF-504 using the Lycoming 502 core. NASA Report CR-120992. NASA Lewis Research Center Cleveland, OH. 1972. pp. 1-182.

* cited by examiner

PYLON SHAPE WITH GEARED TURBOFAN FOR STRUCTURAL STIFFNESS

REFERENCE TO RELATED APPLICATION

This application is a United States National Phase application of PCT/US2013/025717 filed on Feb. 12, 2013, which claims priority to U.S. Provisional Application No. 61/708,927 filed on Oct. 2, 2012.

BACKGROUND OF THE INVENTION

A minimum distance must be maintained between a bottom of a gas turbine engine and a runway, resulting in space limitations for wing mounted gas turbine engines. Larger landing gear can be employed to raise the aircraft, and therefore the gas turbine engine, relative to the runway. However, this can add weight to the aircraft. As fan section becomes larger, there are fewer options for mounting a gas turbine engine.

SUMMARY OF THE INVENTION

A gas turbine engine according to an exemplary embodiment of this disclosure, among other possible things includes a mounting structure for mounting the engine to a pylon. A propulsor section includes a fan having a fan diameter. A geared architecture drives the fan. A generator section includes a fan drive turbine that drives the geared architecture. A turbine to fan diameter ratio is substantially less than 45%.

In a further embodiment of any of the foregoing assemblies includes the gas turbine engine of claim 1 assembled to a pylon mounted to a wing.

In a further embodiment of any of the foregoing assemblies the fan extends forward of the wing.

In a further embodiment of any of the foregoing assemblies a distance of substantially 11 inches is defined between the wing and an upper portion of the gas turbine engine In a further embodiment of any of the foregoing gas turbine engines the geared architecture includes an epicyclic gearbox.

In a further embodiment of any of the foregoing gas turbine engines is mounted to a pylon. The pylon includes a forward portion and an aft portion. The fan is attached to the forward portion of the pylon. The turbine section includes the fan drive turbine which is attached to the aft portion of the pylon.

In a further embodiment of any of the foregoing gas turbine engines and mounting systems the turbine section is a low pressure turbine.

In a further embodiment of any of the foregoing gas turbine engines and mounting systems the turbine to fan diameter ratio is substantially 35% to substantially 40%.

A gas turbine engine according to an exemplary embodiment of this disclosure, among other possible things includes a mounting structure for mounting the engine to a pylon. The pylon includes a forward portion and an aft portion. A propulsor section includes a fan having a fan diameter. The fan is attached to the forward portion of the pylon. A geared architecture drives the fan. A compressor section is included. A combustor is in fluid communication with the compressor section. A generator section includes a fan drive turbine that drives the geared architecture. A turbine to fan diameter ratio that is substantially less than 45%, and the turbine section is attached to the aft portion of the pylon.

In a further embodiment of any of the foregoing assemblies includes the gas turbine engine assembled to a pylon mounted to a wing.

In a further embodiment of any of the foregoing assemblies the fan extends forward of the wing.

In a further embodiment of any of the foregoing assemblies a distance of substantially 11 inches is defined between the wing and an upper portion of the gas turbine engine In a further embodiment of any of the foregoing gas turbine engines the geared architecture includes an epicyclic gearbox.

In a further embodiment of any of the foregoing gas turbine engines the turbine section is a low pressure turbine.

In a further embodiment of any of the foregoing gas turbine engines the turbine to fan diameter ratio is substantially 35% to substantially 40%.

These and other features of the present invention can be best understood from the following specification and drawings, the following of which is a brief description.

DETAILED DESCRIPTION OF THE PREFERRED EMBODIMENT

Figure 1:
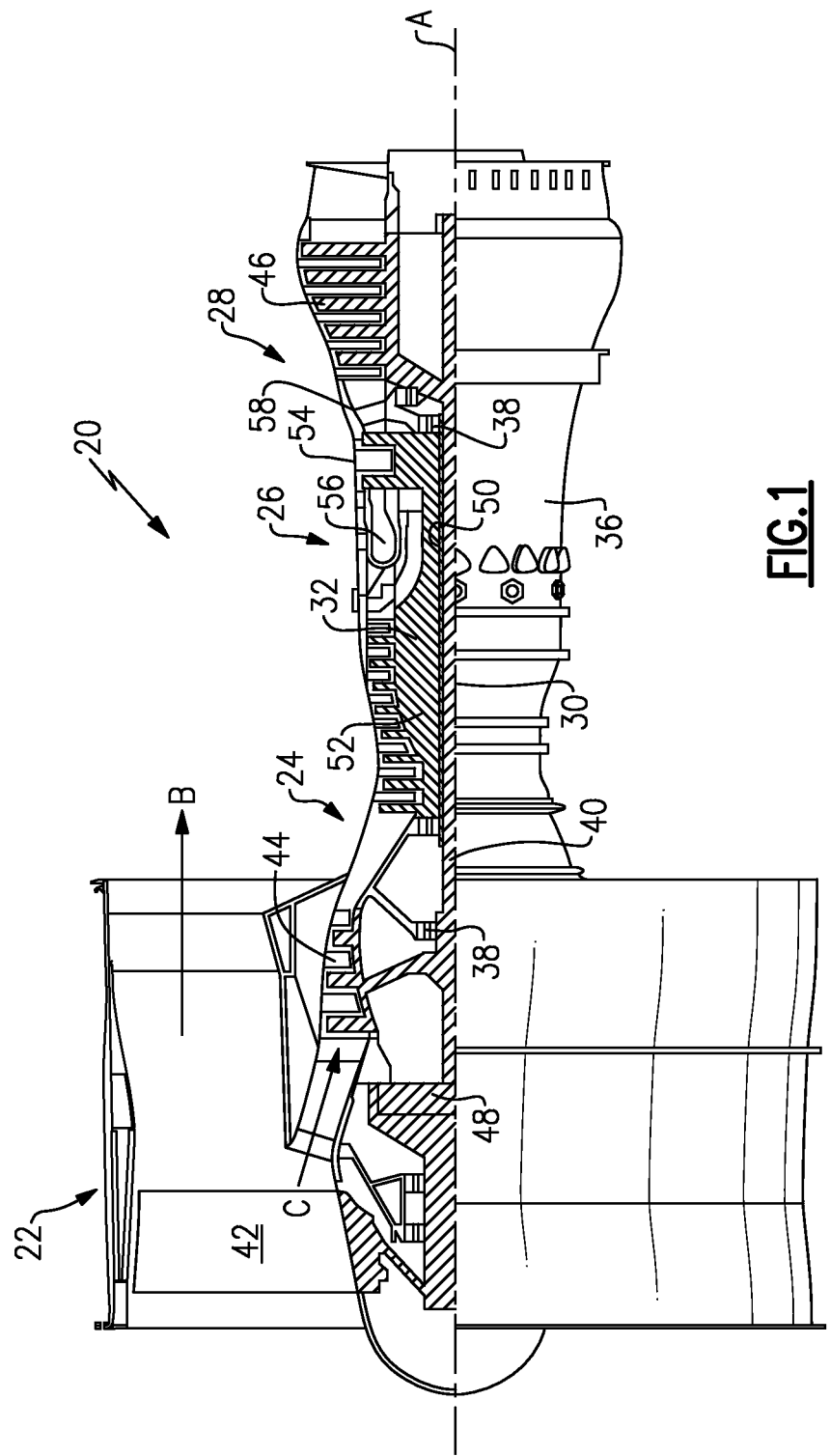
FIG. 1 illustrates a schematic view of an embodiment of a gas turbine engine.

FIG. 1 schematically illustrates an example gas turbine engine 20, such as a geared turbofan engine, that includes a fan section 22, a compressor section 24, a combustor section 26 and a turbine section 28. Alternative engines might include an augmenter section (not shown) among other systems or features. The fan section 22 includes a fan 42 and drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive the fan 42 via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about a central longitudinal axis A relative to an engine static structure 36 via several bearing systems 38. It should be understood that various bearing systems 38 at various locations may alternatively or additionally be provided.

The low speed spool 30 generally includes an inner shaft 40 that connects the fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the central longitudinal axis A. A propulsor section includes the fan 42 and a portion of the geared architecture 48.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine. A generator section includes the compressors 44 and 52, the combustor 56, and the turbines 46 and 54, as well as a portion of the geared architecture 48.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than substantially six (6), with an example embodiment being greater than substantially ten (10). The example geared architecture 48 is an epicyclic gearbox, an epicyclical gear train, such as a planetary gear system, star gear system or other known gear system, with a gear reduction ratio of greater than substantially 2.3.

In one disclosed embodiment, the gas turbine engine 20 includes a bypass ratio greater than substantially ten (10:1) and the fan diameter is significantly larger than an outer diameter of the low pressure compressor 44. It should be understood, however, that the above parameters are only exemplary of one embodiment of a gas turbine engine including a geared architecture 48 and that the present disclosure is applicable to other gas turbine engines.

A significant amount of thrust is provided by the air in the bypass flow path B due to the high bypass ratio. The fan section 22 of the gas turbine engine 20 is designed for a particular flight condition—typically cruise at substantially 0.8 Mach and substantially 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than substantially 1.50. In another non-limiting embodiment the low fan pressure ratio is less than substantially 1.45.

The example gas turbine engine includes the fan 42 that comprises in one non-limiting embodiment less than substantially 26 fan blades. In another non-limiting embodiment, the fan section 22 includes less than substantially 20 fan blades. Moreover, in one disclosed embodiment the low pressure turbine 46 includes no more than substantially 6 turbine rotors schematically indicated at 34. In another non-limiting example embodiment the low pressure turbine 46 includes substantially 3 turbine rotors. A ratio between the number of fan blades and the number of low pressure turbine rotors is between substantially 3.3 and substantially 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
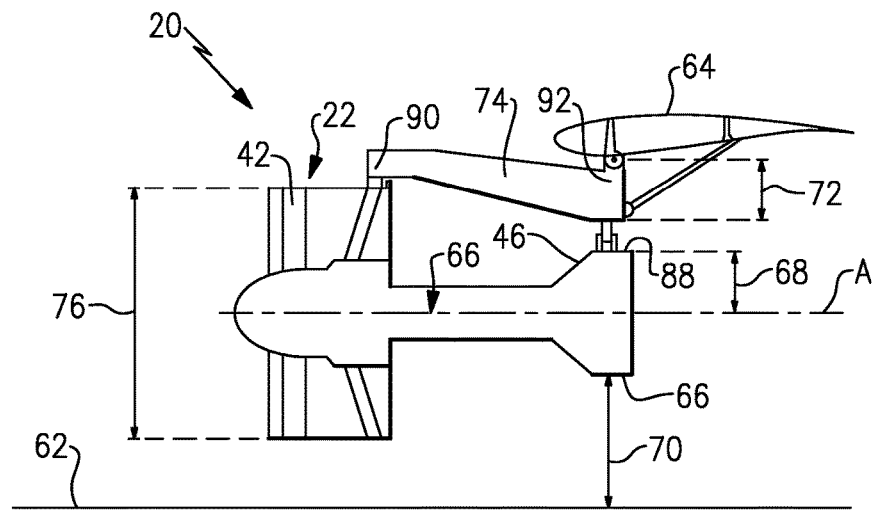
FIG. 2 illustrates a side view of the gas turbine engine mounted to a pylon.
Figure 3:
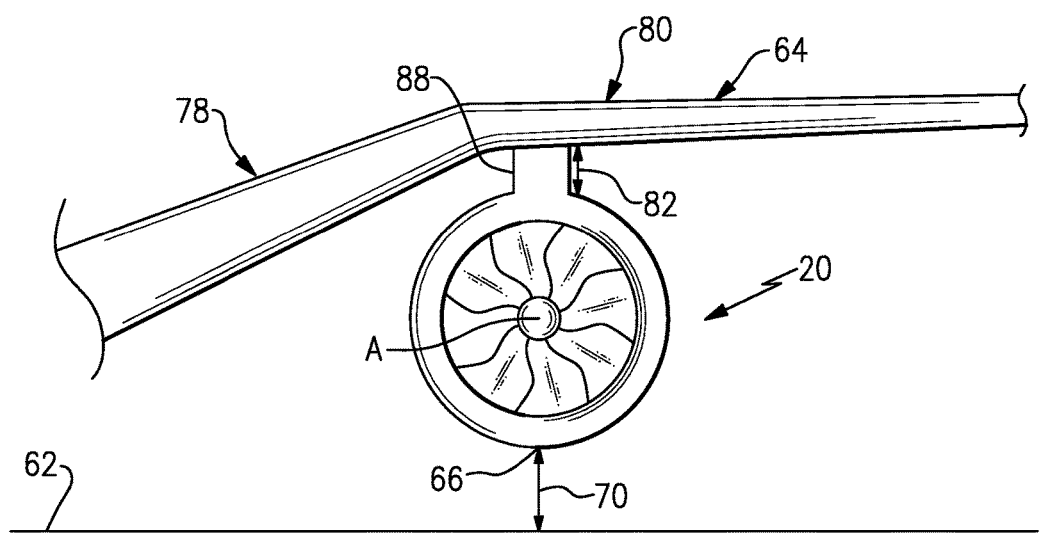
FIG. 3 illustrates a front view of the gas turbine engine mounted to the pylon.

FIGS. 2 and 3 illustrate the gas turbine engine 20 mounted to a pylon 74, which is mounted to a wing 64. The efficiency of the turbine driven geared architecture 48, disclosed above, enables the use and fabrication of a smaller low pressure turbine 46, both in diameter and in the number or overall stages, as compared to a direct drive engine that rotates at a less efficient speed. This allows for alternate and more efficient mounting configurations of the gas turbine engine 20.

A minimum distance 70 or clearance should be maintained between a bottom 66 of the gas turbine engine 20 and a runway 62 (or ground) and should be taken into consideration when determining a mounting configuration for the gas turbine engine 20. When the engine 20 is mounted to the wing 64, a core engine section, including the low pressure turbine 46, can be mounted under the wing 64, and the fan section 22 can disposed forward of the wing 64.

A diameter 68 of the low pressure turbine 46 is much smaller than a diameter 76 of the fan 42. A ratio of the diameter 68 of the low pressure turbine 46 to the diameter 76 of the fan 42 is defined as the turbine to fan diameter ratio. In one example, the turbine to fan diameter ratio is substantially less than 45%. In one example, the turbine to fan diameter ratio is substantially 25% to 45%. In one example, the turbine to fan diameter ratio is substantially 35% to substantially 40%. As the low pressure turbine 46 has a small diameter 68, this allows the central longitudinal axis A to be located closer (or "close coupled", which provides for a cost and weight savings) to the wing 64 than a correspondingly capable direct drive engine. The gas turbine engine 20 can also be located more aft due to the reduced diameter 68 of the low pressure turbine 46.

As the low pressure turbine 46 has a reduced diameter 68, the pylon 74 can also have a height 72 that is greater, or maintained at a given size, than a pylon 74 which mounts a correspondingly direct drive engine, while still maintaining the desired minimum distance 70 relative to the runway 62. The increase in height 72 provides for additional structural support and strength.

The pylon 74 includes a forward portion 90 and an aft portion 92. The fan 42 is attached to the forward portion 90 of the pylon 74, and the low pressure turbine 46 is attached to the aft portion 92 of the pylon 74.

As further shown in FIG. 3, the wing 64 has a sheared or gull wing configuration. The wing 64 includes an up angle portion 78 and a flat portion 80. A distance 82, or gutter height, of substantially 11 inches should be maintained between the wing 64 and an upper portion 88 of the gas turbine engine 20. The up angle portion 78 provides additional space for the gas turbine engine 20 to be mounted under the wing 64, and even allows the mounting of a larger gas turbine engine 20, while still maintaining a desired distance 82 and the minimum distance 70 or clearance. That is, a reduced distance 82 between the gas turbine engine 20 and the wing 64, reducing interference drag.

The gear reduction, or geared architecture 48, can be considered part of the turbofan architecture without departing from the scope of the disclosed embodiments.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A gas turbine engine comprising:
   a mounting structure for mounting the engine to a pylon;
   a propulsor section including a fan having a fan diameter;
   a geared architecture driving the fan; and
   a generator section including a fan drive turbine that drives the geared architecture, wherein a turbine to fan diameter ratio is less than 45%.

2. An assembly including the gas turbine engine of claim 1 assembled to a pylon mounted to a wing.

3. The assembly of claim 2 wherein the fan extends forward of the wing.

4. The assembly of claim 2 wherein a distance of 11 inches is defined between the wing and an upper portion of the gas turbine engine.

5. The gas turbine engine as recited in claim 1 wherein the geared architecture includes an epicyclic gearbox.

6. The gas turbine engine as recited in claim 1, mounted to a pylon, and wherein the pylon includes a forward portion and an aft portion, the fan is attached to the forward portion of the pylon, and the turbine section including the fan drive turbine is attached to the aft portion of the pylon.

7. The gas turbine engine and mounting system as recited in claim 1 wherein the turbine section is a low pressure turbine.

8. The gas turbine engine and mounting system as recited in claim 1 wherein the turbine to fan diameter ratio is 35% to 40%.

9. A gas turbine engine comprising:
   a mounting structure for mounting the engine to a pylon, the pylon including a forward portion and an aft portion;
   a propulsor section including a fan having a fan diameter, wherein the fan is attached to the forward portion of the pylon;
   a geared architecture driving the fan;
   a compressor section;
   a combustor in fluid communication with the compressor section; and
   a generator section including a fan drive turbine that drives the geared architecture, a turbine to fan diameter ratio that is less than 45%, and the turbine section is attached to the aft portion of the pylon.

10. An assembly including the gas turbine engine of claim 1 assembled to a pylon mounted to a wing.

11. The assembly of claim 10 wherein the fan extends forward of the wing.

12. The assembly of claim 10 wherein a distance of 11 inches is defined between the wing and an upper portion of the gas turbine engine.

13. The gas turbine engine as recited in claim 9 wherein the geared architecture includes an epicyclic gearbox.

14. The gas turbine engine as recited in claim 9 wherein the turbine section is a low pressure turbine.

15. The gas turbine engine as recited in claim 9 wherein the turbine to fan diameter ratio is 35% to 40%.

16. The gas turbine engine as recited in claim 1 wherein the turbine to fan diameter ratio is 25% to 45%.

17. The gas turbine engine as recited in claim 9 wherein the turbine to fan diameter ratio is 25% to 45%.

* * * * *